United States Patent
Struye et al.

(12) 
(10) Patent No.: US 6,452,203 B1
(45) Date of Patent: Sep. 17, 2002

(54) METHOD FOR MONITORING A DOSE OF PENETRATING RADIATION ABSORBED BY AN OBJECT

(75) Inventors: Luc Struye, Mortsel; Paul Leblans, Kontich; Peter Willems, Stekene, all of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/427,029

(22) Filed: Oct. 26, 1999

Related U.S. Application Data

(60) Provisional application No. 60/127,152, filed on Mar. 31, 1999.

(30) Foreign Application Priority Data

Nov. 10, 1998 (EP) .............................. 98203794
Feb. 13, 1999 (EP) .............................. 99200436

(51) Int. Cl.$^7$ ................................ G01N 23/04
(52) U.S. Cl. ..................... 250/581; 250/584; 250/337
(58) Field of Search ............................... 250/581, 584, 250/337

(56) References Cited

U.S. PATENT DOCUMENTS

| | | | |
|---|---|---|---|
| 4,970,393 A | | 11/1990 | Funahashi |
| 5,029,221 A | * | 7/1991 | Takiguchi et al. ........... 250/584 |
| 5,536,946 A | * | 7/1996 | Vuylsteke ................... 250/581 |
| 5,654,555 A | * | 8/1997 | Buytaert et al. ............. 250/581 |

FOREIGN PATENT DOCUMENTS

| | | |
|---|---|---|
| EP | 0 679 909 A1 | 11/1995 |
| EP | 0 844 497 A2 | 5/1998 |
| EP | 0 892 283 A1 | 1/1999 |

OTHER PUBLICATIONS

Patent Abstracts of Japan, vol. 095, No. 003, Apr. 28, 1995 and JP 06 337300 A (Nichia Chem. Ind. Ltd.), Dec. 6, 1994.
Patent Abstracts of Japan, vol. 095, No. 008, Sep. 29, 1995 and JP 07 122366 A (Oki Electric Ind. Co. Ltd.), May 12, 1995.

* cited by examiner

*Primary Examiner*—Constantine Hannaher
*Assistant Examiner*—Andrew Israel
(74) *Attorney, Agent, or Firm*—Breiner & Breiner, L.L.C.

(57) ABSTRACT

A method for monitoring a dose of penetrating radiation absorbed by an object, including the steps of providing the object with a device for absorbing penetrating radiation, including a storage phosphor for storing energy from the penetrating radiation; at predetermined intervals, coupling the storage phosphor to a source of stimulation light in such a way that the stimulation light impinges on the phosphor; activating the source of stimulation light so as to cause the storage phosphor to emit an amount of fluorescent light in proportion to an amount of stored energy; reading the amount of fluorescent light and converting it into an electric signal value; storing electric signal value(s) obtained at the predetermined intervals and processing them so as to evaluate a total amount of radiation absorbed by the object; comparing the total amount with a predefined threshold value for obtaining a difference value; and displaying the difference value on a decentralized display.

9 Claims, No Drawings

METHOD FOR MONITORING A DOSE OF PENETRATING RADIATION ABSORBED BY AN OBJECT

RELATED APPLICATION

This application claims benefit of U.S. Provisional Application No. 60/127,152 filed Mar. 31, 1999.

FIELD OF THE INVENTION

This invention relates to a method for monitoring the dose of penetrating radiation absorbed by an object. It relates especially to a method of personnel monitoring wherein the dosimeter comprises a storage phosphor and wherein the result of the dosimetry is displayed on decentralized displays.

BACKGROUND OF THE INVENTION

Several means and ways have been developed to monitor the amount of radiation that has been absorbed by an object. Especially in the field of personnel monitoring several types of dosimeters and readout apparatus have been proposed.

Well-known types of dosimeters are, e.g. based on CsI-crystal scintillators, mostly in the form of a pencil, which provide permanent control. When a quantified critical or threshold value becomes exceeded, a system in the form of a sound alarm may warn the controlled person. Another detection system makes use of detectors in the form of a badge which, after having been borne during a certain period of time are controlled centrally. Quantifying irradiation can be based on silver halide photography (as, e.g. in nuclear power stations, as described in "Gebrauchsanweisung für das Personendosimeter mit Ganzkörperdosimetersonden, Typ GSF-Film-GD 10/20, GSF-Forschungs-zentrum für Umwelt und Gesundheit GmbH—Institut für Strahlenschutz—Auswertungsstelle für Strahlendosimeter—Stand: 1 März 1994).

Another quantifying method can be based on thermoluminescence (e.g. with LiF detectors) or on PSL-dosimetry wherein phosphate glass becomes stimulated with a pulsed ultraviolet laser and wherein erasure is performed thermally.

In EP-A-844 497 a dosimeter using a storage phosphor as means for monitoring the absorbed does has been disclosed. The amount of energy of the penetrating radiation stored in the phosphor is proportional to the absorbed dose and can be read out and the remaining amount of energy stored in the phosphor can be erased by erasing radiation.

However, most of the means for personnel monitoring are not easily connected to an automatic reading system wherein not only the radiation dose absorbed on a particular moment can be read, but where also the radiation history of each individual person can easily be tracked. Moreover, most of the means for personnel monitoring have, for reading, to be processed in a centralized place and the result is not directly available, neither in time nor place, to the person being monitored. Therefore, there is still a need for a further method for personnel monitoring wherein a reusable dosimeter can be used that can automatically be read out, the result displayed in a decentralized way and where the radiation history of a person can automatically be tracked.

OBJECTS AND SUMMARY OF THE INVENTION

It is an object of the invention to provide a method for monitoring the dose of penetrating radiation absorbed by an object using a reusable dosimeter making it possible to automatically keep track of the "radiation history" of the object.

It is a further object to provide a method for monitoring the dose of penetrating radiation absorbed by an object using a reusable dosimeter making it possible to check the absorbed dose in a decentralized reader.

Further objects and advantages of the invention will become clear from the detailed description hereinafter.

The objects of the invention are realized by providing a method for monitoring a dose of penetrating radiation absorbed by an object, comprising the steps of:

providing said object with a monitoring device having a storage phosphor for storing energy from penetrating radiation, at predetermined intervals, coupling said monitoring device to a source of stimulating light in such a way that said stimulating light impinges on said phosphor, activating said source of stimulating light so as to cause said storage phosphor to emit an amount of fluorescent light in proportion to an amount of stored energy, reading said amount of fluorescent light and converting said amount of fluorescent light in an electric signal value, storing electric signal value(s) obtained at said predetermined intervals and processing them so as to evaluate a total amount of radiation absorbed by said object, comparing said total amount with a pre-defined threshold value for obtaining a difference, and displaying said difference on a decentralized display.

DETAILED DESCRIPTION OF THE INVENTION

It was found that dosimeters, for use in the dosimetry of objects as well as for use in personnel monitoring, wherein the radiation absorbing device contains a stimulable phosphor for absorbing the dose of penetrating radiation could easily be read out without the need of much processing. In such dosimeters, the amount of absorbed radiation could directly, in time as well as in place, be converted in an electric signal value that could be stored and manipulated in a computer. In EP-A-844 497, EP-A-892 283 and European Application 98203794, filed Nov. 10, 1998, dosimeters comprising stimulable phosphors have been disclosed.

This presents an advantage over the classical dosimeter. In the latter dosimeters, the absorbed dose of penetrating radiation is only known after some time and is measured away from the place where penetrating radiation is used. This can be harmful to the personnel working with penetrating radiation since such person is only warned of having received a dose of penetrating radiation only after some time. Thus, such a person can, in the meantime between receiving the radiation dose and knowing that dose, still work in an environment where the risk of radiation exists, although on the basis of the received dose, such person would be prohibited from working in such place.

Thus, a dosimetric method that makes it possible to read the absorbed dose immediately at the place where the radiation risk is present, gives the advantage that a person having received a dose of penetrating radiation can know it immediately, and the necessary safety measures can be taken directly.

This problem can be solved when using a photostimulable phosphor as a device for absorbing the penetrating radiation.

Storage phosphors are inorganic substances that, upon irradiation by penetrating radiation, absorb energy of the penetrating radiation and store a portion of said energy. The stored energy can then later on be detected by irradiating said storage phosphor (stimulating said phosphor) by electromagnetic radiation with wavelengths ranging from 300 nm to 1200 nm (i.e. by stimulation light) or by heating said phosphor. Upon said irradiation or heating all or a portion of the energy stored in the storage phosphor is released as electromagnetic radiation (e.g., Ultraviolet (UV) light, visible light, and Infrared (IR) light). This electromagnetic radiation, further on called "fluorescent light," can then be detected. Such phosphors are well known from their use in medical imaging, where, after exposure to penetrating radiation the phosphor is pixel-wise stimulated. When using such a phosphor in dosimetry, the phosphor does not have to be pixel-wise stimulated, a simple overall stimulation is sufficient, since in dosimetry only the amount of absorbed penetrating radiation has to be determined. Thus, the detection of an amount of penetrating radiation stored in a storage phosphor (photostimulable phosphor) can proceed without any complicated processing. Therefore, it is possible to build a simple, small, inexpensive reader for reading the amount of energy stored in the storage phosphor and displaying this amount. Such a reader can easily be placed at or near the location where the penetrating radiation is used so that the absorbed dose can immediately be read at the place where the radiation risk is present.

Basically the method of the present invention comprises the steps of providing an object with a device for absorbing penetrating radiation, including a storage phosphor for storing energy from said penetrating radiation, at predetermined intervals, coupling said storage phosphor to a source of stimulation light, in such a way that said stimulation light impinges on said phosphor, activating said source of stimulation light so as to cause said storage phosphor to emit an amount of fluorescent light in proportion to an amount of stored energy, reading said amount of fluorescent light and converting it into an electric signal value, storing electric signal value(s) obtained at said predetermined intervals and processing them so as to evaluate a total amount of radiation absorbed by said object, comparing said total amount with a pre-defined threshold value for obtaining a difference value, and displaying said difference value on a decentralized display.

This decentralized display can be a display screen or a printer.

In a preferred embodiment of the invention said steps of activating said source of stimulating light so as to cause said storage phosphor to emit an amount of fluorescent light in proportion to an amount of stored energy, reading said amount of fluorescent light and converting said amount of fluorescent light into an electric signal value, proceeds in a decentralized reader. From this reader the electric signal value can then be sent to a central computer where the electric signal value(s) obtained at said predetermined intervals is stored and processed so as to evaluate a total amount of radiation absorbed by the object and where said total amount is compared with a pre-defined threshold value for obtaining a difference value. This difference value is then sent back to a decentralized display at or near the location where the penetrating radiation is used.

In a further preferred embodiment, the steps of storing electric signal value(s) obtained at said predetermined intervals and processing them so as to evaluate a total amount of radiation absorbed by said object, and comparing said total amount with a predefined threshold value for obtaining a difference value, are executed in the decentralized reader from where it is sent to a display, that can be incorporated in the reader or that can be a separate device. When all steps of the method are executed in a decentralized reader, it may be beneficial to send the difference value to a centralized memory so that the radiation history of the object can be kept centrally.

The storage phosphor.

The method of this invention can be implemented using any storage phosphor known in the art. Heat stimulable phosphors, useful in the present invention are, e.g., SrS:Ce, Sm; SrS:Eu,Sm; etc., as disclosed in U.S. Pat. No. 3,859,527 or LiF:Mg,Ti available from Harshaw Chemical Company, Cleveland, Ohio, USA.

Light stimulable storage phosphors, also called stimulable phosphors or photostimulable phosphors, are well known in the art of medical radiography. A system for radiography, using storage phosphors, has been described in U.S. Pat. No. 4,239,968 where a method is claimed for recording and reproducing a radiation image comprising the steps of (i) causing a visible ray- or infrared ray-stimulable phosphor to absorb a radiation passing through an object, (ii) stimulating said phosphor with stimulation rays selected from visible rays and infrared rays to release the energy of the radiation stored therein as fluorescent light, wherein said phosphor is an alkaline earth metal fluorohalide phosphor represented by the formula: $(Ba_{1-x}M_x^{II})FX:yA$ wherein $M^{II}$ is one or more of Mg, Ca, Sr, Zn and Cd; X is one or more of Br, Cl or I; A is at least one member of the group consisting of Eu, Tb, Ce, Tm, Dy, Pr, Ho, Nd, Yb and Er; and x is in the range $0 \leq x \leq 0.6$ and y is in the range $0 \leq y \leq 0.2$, and that the wavelength of said stimulating rays is not less than 500 nm.

Any variant of alkaline earth metal fluorohalide stimulable phosphor is useful in the present invention. Typical examples of such stimulable phosphors are given below, without however limiting the bariumfluorohalide useful in the present invention to these examples.

In EP-A-345 903, a phosphor has been disclosed with the formula $Ba_{1-x}Sr_xF_{2-a-b}Br_aX_b:zA$, wherein X is at least one member selected from the group consisting of Cl and I; x is in the range $0.10 \leq x \leq 0.55$; a is in the range $0.70 \leq a \leq 0.96$; b is in the range $0 \leq b \leq 0.15$; z is in the range $10^{-7} < z < 0.15$, and A is $Eu^{2+}$ or $Eu^{2+}$ together with one or more of the co-dopants selected from the group consisting of $Eu^{3+}$, Y, Tb, Ce, Tm, Dy, Pr, Ho, Nd, Yb, Er, La, Gd and Lu, and wherein fluorine is present stoichiometrically in said phosphor in a larger atom % than bromine taken alone or bromine combined with chlorine and/or iodine.

In U.S. Pat. No. 4,261,854 a phosphor is disclosed with formula BaFX:xCe,yA wherein $0 < x \leq 2 \cdot 10^{-1}$ and $0 \leq y \leq 5 \cdot 10^{-3}$.

In U.S. Pat. No. 4,336,154 a phosphor is disclosed with formula $(Ba_{1-x}M^{2+}x) F_2 \cdot aBaX_2:yEuzB$, wherein $0.5 \leq a \leq 1.25$; $0 \leq x \leq 1$; $10^{-6} \leq y \leq 2 \cdot 10^{-1}$; $0 < z \leq 2 \cdot 10^{-1}$.

In EP-A-704 511 a stimulable bariumfluorohalide is disclosed with formula $Ba_{1-x-y''-z-r}Sr_xPb_{y''}Cs_{2r}Eu_zF_{2-a-b}Br_aI_b$, wherein $0 \leq x \leq 0.30$, $10^{-4} < y'' < 10^{-3}$, $10^{-7} < z < 0.15$, $0 \leq r \leq 0.05$, $0.75 \leq a+b \leq 1.00$, $0.05 < b < 0.20$.

In European application 96202816.3, filed Oct. 10, 1996, a stimulable phosphor has been disclosed with formula $Ba_{1-x-y-p-3q-z}Sr_xM_y^{2+}M_{2p}^{1+}M_{2q}^{3+}F_{2-a-b}Br_aI_b:zEu$, wherein $M^{1+}$ is at least one alkali metal selected from the group consisting of Li, Na, K, Rb and Cs; $M^{2+}$ is at least one divalent metal selected from the group consisting of Ca, Mg and Pb; $M^{3+}$ is at least one trivalent metal selected from the group consisting of Al, Ga, In, Tl, Sb, Bi, Y, La, Ce, Pr, Nd, Sm, Gd, Tb, Dy, Ho, Er, Tm, Yb and Lu; $0 \leq x \leq 0.30$, $0 \leq y \leq 0.10$, $0 \leq p \leq 0.3$, $0 \leq q \leq 0.1$, $0.05 \leq a \leq 0.76$, $0.20 \leq b \leq 0.90$, $a+b<1.00$ and $10^{-6} \leq z \leq 0.2$.

Not only bariumfluorohalide storage phosphors can be used in this invention, but also halosilicate phosphors as disclosed in, e.g., EP 304 121, EP 382 295 and EP 522 619.

Although any stimulable (storage) phosphor known in the art is useful in a label according to the present invention, it is preferred to use stimulable phosphors with slow dark decay. A storage phosphor having stored energy after being exposed to penetrating radiation releases (part of) the stored energy as stimulated light upon stimulation with stimulation light, as explained above. A storage phosphor having stored energy after being exposed to penetrating radiation can release said stored energy also without irradiation with stimulation light. This latter way of releasing energy is called the "dark decay."

The dark decay is measured by irradiating a phosphor by penetrating radiation of 70 kVp, and, immediately after said irradiation, stimulating said phosphor by a He-Ne laser of 30 mW. The fluorescent light emitted by the phosphor upon stimulation is collected and brought to a photomultiplier (Hamamatsu R 376) giving a corresponding electrical current, proportional to the amount of emitted fluorescent light. This gives the initial value of the amount of fluorescent light. The irradiation of the phosphor with penetrating radiation is repeated, but the reading of the amount of stimulable light for a given intensity of stimulating energy only takes place after keeping the irradiated phosphor for a given time in the dark. This process is repeated and the time after which the emitted fluorescent light, (and thus the energy remaining in the phosphor) of a phosphor kept in the dark, has fallen to 1/e is recorded as "dark decay." A storage phosphor, for use in the first embodiment of this invention, has preferably a dark decay longer than 60 minutes, preferably longer than 120 minutes.

The device for absorbing penetrating radiation.

The device for absorbing penetrating radiation including a storage phosphor, useful in the method of this invention, can comprise a storage phosphor in the form of a self-supporting panel, but preferably the storage phosphor is coated on a support. The storage phosphor and an electroluminescent device can be coupled together in the dosimeter. Such dosimeters have been described in European application 98203794.7 filed on Nov. 10, 1998 titled "Reusable personal monitoring device". Such a device can be a device for recording and storing incident radiation energy and for reading said energy comprising:

a stimulable phosphor absorbing and storing said energy and being stimulable with a wavelength $\lambda a$, an electroluminescent phosphor emitting, upon application of an electrical field, stimulation light with said wavelength $\lambda a$ wherein said device is equipped with means in order to apply an electrical field on said electroluminescent phosphor, and wherein said stimulable phosphor and said electroluminescent phosphor are positioned relative to each other so that said light emitted by said electroluminescent phosphor reaches said stimulable phosphor for stimulating said phosphor in order to release stimulated light as a detectable signal.

The device can comprise in order a storage phosphor panel as a storage medium for absorbing incident radiation energy, adjacent there to at one side a transparent support permitting exposure of said storage phosphor panel with said incident radiation energy, adjacent thereto on the other side and/or incorporated into the storage phosphor panel, thus forming one layer in that case, an electroluminescent layer emitting stimulation light in order read-out said storage phosphor panel, adjacent to said electroluminescent layer and farther from the storage phosphor panel, consecutively an isolating layer and a conducting layer.

The device comprises further preferably means for identifying the object or the person that was provided with the dosimeter. These means for identification can be human readable or can be machine readable. Preferably the identification means are machine readable, e.g. bar-codes, a magnetic memory, an electronic memory chip, an electronic processor chip, etc. This makes it possible, upon insertion of the dosimeter in a decentralized reader, to automatically identify the bearer. When the reading of the absorbed dose proceeds in a de-central way, but when the radiation history is stored centrally, the automatic identification can be used to retrieve that radiation history from the central member. In that way, at any moment, the actual dose absorbed in the dosimeter can be displayed decentrally together with the radiation history.

When the dosimeter comprises a processor chip, then it is possible to execute the steps of storing electric signal value(s) obtained at said predetermined intervals and processing them so as to evaluate a total amount of radiation absorbed by said object, and comparing said total amount with a predefined threshold value for obtaining a difference value, and storing the radiation history in the processor chip on the dosimeter.

The decentralized reader.

Such a reader comprises a slot for inserting the storage phosphor, means for emitting stimulation light positioned in such a way that the stimulation light can reach the storage phosphor.

The means for emitting stimulating light can be a source infrared light (even a heat source) for heat stimulable phosphors or can be any light source known in the art of radiography with storage panels. Preferably it is an electroluminescent device so that the reader can be made compact.

In the method of this invention it is also possible to use a dosimeter wherein the storage phosphor and an electroluminescent device are coupled together in the dosimeter. Such dosimeters have been described in European application 98203794.7 filed on Nov. 10, 1998 titled "Reusable personal monitoring device". In this case no stimulating light source is necessary in the reader.

The reader comprises further means for reading the identification on the dosimeter, means for reading the emitted light and converting it into an electric signal, means for sending that electric signal to a central computer and/or means to process the electric signal in the de-central reader itself and/or means for using a processor chip on the dosimeter for processing the electric signal, etc. The reader further comprises a display screen or is coupled to a printer to show the condition of the person or object wearing the dosimeter with respect to the actual absorbed dose and radiation history.

What is claimed is:

1. A method for monitoring a dose of penetrating radiation absorbed by an object, comprising providing said object with a radiation absorbing device, including a storage phosphor, for storing energy from said penetrating radiation, at predetermined intervals, in a decentralized reader, coupling said storage phosphor to a source of stimulation light, in such a way that said stimulation light impinges on said phosphor, activating said source of stimulation light so as to cause said storage phosphor to emit an amount of fluorescent light in proportion to an amount of stored energy, reading said amount of fluorescent light and converting it into an electric signal value, storing in a decentralized reader electric signal value(s) obtained at said predetermined intervals and processing them so as to evaluate a total amount of radiation absorbed by said object, comparing in a decentralized reader said total amount with a pre-defined threshold value for obtaining a difference value, and displaying said difference value on a decentralized display, and sending said difference value to a central memory for storing the difference value.

2. A method for monitoring a dose of penetrating radiation absorbed by an object, comprising providing said object with-a radiation absorbing device, including a storage phosphor, for storing energy from said penetrating radiation, at predetermined intervals, in a decentralized reader, coupling said storage phosphor to a source of stimulation light which is an electroluminescent device, in such a way that said stimulation light impinges on said phosphor, activating said source of stimulation light so as to cause said storage phosphor to emit an amount of fluorescent light in proportion to an amount of stored energy, reading said amount of fluorescent light and converting it into an electric signal value, storing in a decentralized reader electric signal value(s) obtained at said predetermined intervals and processing them so as to evaluate a total amount of radiation absorbed by said object, comparing in a decentralized reader said total amount with a pre-defined threshold value for obtaining a difference value, and displaying said difference value on a decentralized display and sending said difference value to a central memory for storing the difference value.

3. A method for monitoring a dose of penetrating radiation absorbed by an object, comprising providing said object with a radiation absorbing device, including a storage phosphor, for storing energy from said penetrating radiation, and an electronic memory chip, at predetermined intervals, in a decentralized reader, coupling said storage phosphor to a source of stimulation light, in such a way that said stimulation light impinges on said phosphor, activating said source of stimulation light so as to cause said storage phosphor to emit an amount of fluorescent light in proportion to an amount of stored energy, reading said amount of fluorescent light and converting it into an electric signal value, storing in a decentralized reader electric signal value(s) obtained at said predetermined intervals and processing them so as to evaluate a total amount of radiation absorbed by said object, comparing in a decentralized reader said total amount with a pre-defined threshold value for obtaining a difference value, and displaying said difference value on a decentralized display and storing said difference value in said electronic memory chip.

4. A method for monitoring a dose of penetrating radiation absorbed by an object, comprising providing said object with a radiation absorbing device, including a storage phosphor, for storing energy from said penetrating radiation, and an electronic memory chip, at predetermined intervals, in a decentralized reader, coupling said storage phosphor to a source of stimulation light which is an electroluminescent device, in such a way that said stimulation light impinges on said phosphor, activating said source of stimulation light so as to cause said storage phosphor to emit an amount of fluorescent light in proportion to an amount of stored energy, reading said amount of fluorescent light and converting it into an electric signal value, storing in a decentralized reader electric signal value(s) obtained at said predetermined intervals and processing them so as to evaluate a total amount of radiation absorbed by said object, comparing in a decentralized reader said total amount with a pre-defined threshold value for obtaining a difference value, and displaying said difference value on a decentralized display and storing said difference value in said electronic memory chip.

5. A method for monitoring a dose of penetrating radiation absorbed by an object, comprising providing said object with a radiation absorbing device, including a storage phosphor, for storing energy from said penetrating radiation, at predetermined intervals, in a decentralized reader, coupling said storage phosphor to a source of stimulation light, in such a way that said stimulation light impinges on said phosphor, activating said source of stimulation light so as to cause said storage phosphor to emit an amount of fluorescent light in proportion to an amount of stored energy, reading said amount of fluorescent light and converting it into an electric signal value, storing in a decentralized reader electric signal value(s) obtained at said predetermined intervals and processing them so as to evaluate a total amount of radiation absorbed by said object, comparing in a decentralized reader said total amount with a pre-defined threshold value for obtaining a difference value, and displaying said difference value on a decentralized display, wherein said radiation absorbing device includes a processor chip and wherein said steps of storing electric signal value(s) obtained at said predetermined intervals and processing them so as to evaluate a total amount of radiation absorbed by said object, and comparing said total amount with a pre-defined threshold value for obtaining a difference value, proceed in said processor chip.

6. A method for monitoring a dose of penetrating radiation absorbed by an object, comprising providing said object with a radiation absorbing device, including a storage phosphor, for storing energy from said penetrating radiation, at predetermined intervals, in a decentralized reader, coupling said storage phosphor to a source of stimulation light which is an electroluminescent device, in such a way that said stimulation light impinges on said phosphor, activating said source of stimulation light so as to cause said storage phosphor to emit an amount of fluorescent light in proportion to an amount of stored energy, reading said amount of fluorescent light and converting it into an electric signal value, storing in a decentralized reader electric signal value(s) obtained at said predetermined intervals and processing them so as to evaluate a total amount of radiation absorbed by said object, comparing in a decentralized reader said total amount with a pre-defined threshold value for obtaining a difference value, and displaying said difference value on a decentralized display, wherein said radiation absorbing device includes a processor chip and wherein said steps of storing electric signal value(s) obtained at said predetermined intervals and processing them so as to evaluate a total amount of radiation absorbed by said object, and comparing said total amount with a pre-defined threshold value for obtaining a difference value, proceed in said processor chip.

7. A method for monitoring a dose of penetrating radiation absorbed by an object, comprising providing said object with a radiation absorbing device, including a storage phosphor, for storing energy from said penetrating radiation, and an electroluminescent device, as a source of stimulation light, coupled to said phosphor, in such a way that said stimulation light impinges on said phosphor, at predetermined intervals, in a decentralized reader, activating said source of stimulation light so as to cause said storage phosphor to emit an amount of fluorescent light in proportion to an amount of stored energy, reading said amount of fluorescent light and converting it into an electric signal value, storing in a decentralized reader electric signal value(s) obtained at said predetermined intervals and processing them so as to evaluate a total amount of radiation absorbed by said object, comparing in a decentralized reader said total amount with a pre-defined threshold value for obtaining a difference value, and displaying said difference value on a decentralized display and sending the difference value to a central memory for storing the difference value.

8. A method for monitoring a dose of penetrating radiation absorbed by an object, comprising providing said object with a radiation absorbing device, including a storage phosphor, for storing energy from said penetrating radiation, an electronic memory chip, and an electroluminescent device, as a source of stimulation light, coupled to said phosphor, in such a way that said stimulation light impinges on said phosphor, at predetermined intervals, in a decentralized reader, activating said source of stimulation light so as to cause said storage phosphor to emit an amount of fluorescent light in proportion to an amount of stored energy, reading said amount of fluorescent light and converting it into an electric signal value, storing in a decentralized reader electric signal value(s) obtained at said predetermined intervals and processing them so as to evaluate a total amount of radiation absorbed by said object, comparing in a decentralized reader said total amount with a pre-defined threshold value for obtaining a difference value, and displaying said difference value on a decentralized display and storing the difference value in said electronic memory chip.

9. A method for monitoring a dose of penetrating radiation absorbed by an object, comprising providing said object with a radiation absorbing device, including a storage phosphor, for storing energy from said penetrating radiation, and an electroluminescent device, as a source of stimulation light, coupled to said phosphor, in such a way that said stimulation light impinges on said phosphor, at predetermined intervals, in a decentralized reader, activating said source of stimulation light so as to cause said storage phosphor to emit an amount of fluorescent light in proportion to an amount of stored energy, reading said amount of fluorescent light and converting it into an electric signal value, storing in a decentralized reader electric signal value(s) obtained at said predetermined intervals and processing them so as to evaluate a total amount of radiation absorbed by said object, comparing in a decentralized reader said total amount with a pre-defined threshold value for obtaining a difference value, and displaying said difference value on a decentralized display, wherein said radiation absorbing device includes a processor chip and wherein said steps of storing electric signal value(s) obtained at said predetermined intervals and processing them so as to evaluate a total amount of radiation absorbed by said object, and comparing said total amount with a pre-defined threshold value for obtaining a difference value, proceed in said processor chip.

\* \* \* \* \*